United States Patent [19]
Komai et al.

[11] Patent Number: 5,283,699
[45] Date of Patent: Feb. 1, 1994

[54] MICRO-BAR CODE READER SYSTEM

[75] Inventors: Toshiyuki Komai, Nagoya; Yuuki Nakamura, Ichinomiya, both of Japan

[73] Assignee: Neorex Co., Ltd., Nagoya, Japan

[21] Appl. No.: 996,407

[22] Filed: Dec. 23, 1992

[30] Foreign Application Priority Data

Dec. 28, 1991 [JP] Japan .................... 3-359030

[51] Int. Cl.⁵ .............................................. G02B 27/00
[52] U.S. Cl. ..................................... 359/896; 359/732; 235/462; 250/271; 250/557
[58] Field of Search ............... 359/896, 798, 799, 800, 359/732, 737, 738; 235/462, 435, 436, 437, 482, 485, 487, 490, 494; 250/271, 555, 556, 557

[56] References Cited

U.S. PATENT DOCUMENTS

| | | | |
|---|---|---|---|
| 3,663,813 | 5/1972 | Shaw | 250/271 |
| 4,510,383 | 4/1985 | Ruppender | 235/462 |
| 4,531,060 | 7/1985 | Suwa et al. | 250/557 |

FOREIGN PATENT DOCUMENTS 61-289470 12/1986 Japan .
61-289471 12/1986 Japan .

Primary Examiner—Loha Ben
Attorney, Agent, or Firm—Wenderoth, Lind & Ponack

[57] ABSTRACT

A bar code reader system is adapted to read a micro-bar code and includes a light emitting body for irradiating a light beam onto a bar code surface on which the micro-bar code to be read is provided. A focusing lens focuses a reflected light from the bar code surface. An image pick-up device receives the focused reflected light and forms an image of the micro-bar code to be read. A cylindrical lens body is arranged to pass therethrough both the light beam from the light emitting body and the reflected light beam reflected from the bar code surface. The cylindrical lens body is oriented with an axis thereof substantially consistent with a bar code reading direction.

16 Claims, 15 Drawing Sheets

MICRO-BAR CODE READER SYSTEM

BACKGROUND OF THE INVENTION

1. Field of the Invention

The present invention relates to a bar code reader system for reading information from a micro-bar code which is reduced in size in comparison with known and currently available bar codes. More specifically, the invention relates to a bar code reader which can assure reading of information from the micro-bar code.

2. Description of the Related Art

As is well known, a bar code is designed to encode information, e.g. various characters, such as letters, figures, signs, by combination of a plurality of solid bars arranged in mutually parallel relationship to one another and blank intervals between the bars (which will be hereafter referred to as white bars). The following four types of bar codes are typically put into use.

(1) JAN (Japanese Article Number) Code

This coding system has been used for identification of consumer goods produced in Japan. The JAN coding system is compatible with UPC (Universal Product Code) used in the United States and EAN (European Article Number) used in Europe and Asia. In the JAN coding system, 13 digits of standard code and 8 digits of compressed code are available. The standard JAN code includes two digits of a country code, five digits of a product maker code, five digits of a product item code and one check digit. The compressed code has essentially the same code format to the standard code but has four digits of the product maker code and one digit of the, product item code. In the JAN coding system, only figures or numbers of 0~9 can be expressed by the combination of the solid bars and white bars. This coding system is convenient for a reading operation since it is not sensitive to scanning directions of a bar code reader.

(2) ITF (Interleaved Two of Five) Code

ITF coding system is a standard coding system adapted to physical distribution, which is established by adding a physical distribution identification code of 1 or 3 (including one leading digit which is normally 0) to the foregoing JAN code. Therefore, this ITF code may express only figures or numbers of 0~9. This coding system is successfully employed in the field of transportation. In addition, this coding system is employed as data for timed recording of a video tape recorder (VTR). The ITF coding system features high recording density and enables a stable information reading precision level even when the bar code is printed on a printing medium having a poor printing condition.

(3) CODE 39

In this coding system, one character is expressed by nine bars (four white bars between five solid bars). Among the nine bars, three bars, are thick solid or white bars having greater width. An asterisk (*) is employed as a start and stop code. This coding system makes it possible to express figures or numbers of 0~9, alphabetic letters of A~Z, various signs (e.g., +, −, blank space, /, $, %, ·). This coding system has been employed as standard in industrial fields for factory automation. AIAG for U. S. automobile manufacturing and HIBC for U. S. hospitals and pharmaceutical industries are well known examples of this type of coding system.

(4) NW-7 (CODABAR)

In this coding system, one character is expressed by seven bars (three white bars between four solid bars). Among the seven bars, two or three bars are thicker bars. One of A, B, C and D is used as a start and stop code. This coding system is capable to express figures or numbers of 0~9 and various signs (e.g., +, −, blank space, /, $, %, ·).

Bar code readers for reading information recorded on the bar codes, include CCD type bar code readers which read information employing charge-coupled devices (CCDs) and laser scanners which are adapted to scan the bar code ,with laser beams. For hand-held type bar code readers, the CCD type readers are frequently used due to reduction of size and weight and being less expensive.

Discussion will be given for one example of the conventional CCD type bar code reader with reference to FIGS. 10 to 12.

FIG. 10 shows the conventional bar code reader system 20 in operation. FIG. 11 is a diagrammatic illustration of an arrangement of components of an optical system employed in the conventional bar code reader of FIG. 10, as viewed from the front. FIG. 12 is a diagrammatic illustration of the optical system of FIG. 11 as viewed from the side. As can be seen from FIGS. 11 and 12, the bar code reader system comprises a CCD sensor 1, a focusing lens 2 and a pair of light emitting elements (which are aligned in the transverse direction relative to the plane of FIG. 12). The bar code reader 20 shown in FIG. 10 is designed to be gripped by a hand and to place the tip end onto a bar code 5a in an attitude perpendicular to a plane on which the bar code 5a is printed. By this, an image of the bar code 5a irradiated by the light beam from the light emitting elements is received by the CCD sensor 1 through the focusing lens 2 as reflected light. The image of the bar code 5a formed on the CCD sensor 1 is converted into electrical signals. Then the information contained in the bar code is decoded by a decoder (not shown).

The shown bar code reader 20 is particularly adapted to read information from a compressed size of bar code (hereafter referred to as "micro-bar code") which has a bar width of approximately 100 μm of the thinnest solid bar, and the length of the bars is in a range of approximately 1~10 mm. In order to facilitate aligning of the beam axis 7 of the CCD sensor 1 in the bar code reader system 20 to the bar code 5a, a cut out 10 is formed at the tip end of the system 20.

However, when the micro-bar code is read by the bar code reader system 20 constructed as set forth above, the following problems are to be encountered. FIG. 13)a) is a diagrammatic illustration showing part of the bar code on an enlarged scale. Very high attention is paid to printing the bas codes. However, there are inherently caused defects in the solid bar, spots in the white bars and blurring or distortion of the solid, bars. When such defective bar code is scanned along three lines (1), (2) and (3) shown in FIG. 13(a) FIG 13(b)is timing chart showing the result of such scan through the lines (1), (2) and (3), in which an output signal becomes HIGH level when a solid bar is detected and LOW level when a white bar is detected. As is apparent from FIG. 13(b), the results are differentiated and contain a reading error α due to a defect of void V in the solid bar, the reading error β due to blurring and a reading error γ due to spot S in the white bar.

In addition, due to the presence of the cut out 10 at the tip end of the bar code reader system 20 in order to facilitate positioning thereof relative to the bar code 5a, external light may penetrate through the cut out 10 to cause variation of the intensity of the light received at the CCD sensor 1. Therefore, adjustment of the exposure period of the CCD sensor 1 is required. This extends the period required for decoding the information recorded on the bar code 5a and thus lowers efficiency the information reading operation.

Furthermore, it is possible for dust and dirt to penetrate through the cut out 10 to adhere to optical parts such as the light receiving surface of the CCD sensor 1 to make the information reading operation impossible.

SUMMARY OF THE INVENTION

The present invention is provided to solve the problems as set forth above. Therefore, it is an object of the present invention to provide a bar code reader system which can certainly read information from a micro-bar code which is smaller than the conventional bar code.

In order to accomplish the above-mentioned and other objects, a micro-bar code reader system according to the present invention includes a cylindrical lens disposed in a light path between a surface on which a micro-bar code to be read is provided and a focusing lens, so that both of an irradiating light to be irradiated on the surface and a reflected light reflected from the surface will pass through the cylindrical lens.

According to one aspect of the invention, a bar code reader system for reading information contained in a micro-bar code comprises:

a light emitting body for irradiating a light beam onto a bar code surface on which the micro-bar code to be read is provided;

a focusing lens for focusing a reflected light from the bar code surface;

an image pick-up means for receiving the focused reflected light and forming an image of the micro-bar code to be read; and a cylindrical lens body arranged to pass both of the light beam from the light emitting body and the reflected light beam reflected from the bar code surface therethrough, the cylindrical lens body being arranged with the axis thereof oriented substantially consistent with a bar code reading direction.

According to another aspect of the invention, a bar code reader system for reading information contained in a micro-bar code comprises:

a light emitting body for irradiating a light beam onto a bar code surface on which the micro-bar code to be read is provided, the light emitting body comprising a pair of light emitting diodes;

a focusing lens for focusing a reflected light from the bar code surface;

an image pick-up means for receiving the focused reflected light and forming an image of the micro-bar code to be read, the image pick-up means comprising a charge coupled device serving as an image pick-up element; and a cylindrical lens body arranged to pass both of the light beam from the light emitting body and the reflected light beam reflected from the bar code surface therethrough, the cylindrical lens body being arranged with the axis thereof oriented substantially consistent with a bar code reading direction.

BRIEF DESCRIPTION OF THE DRAWINGS

The present invention will be understood more fully from the detailed description given herebelow and from the accompanying drawings of preferred embodiments of the invention, which, however, should not be taken to be limitative to the invention but are for explanation and understanding only.

In the drawings.

DESCRIPTION OF THE PREFERRED EMBODIMENTS

Figure 1:
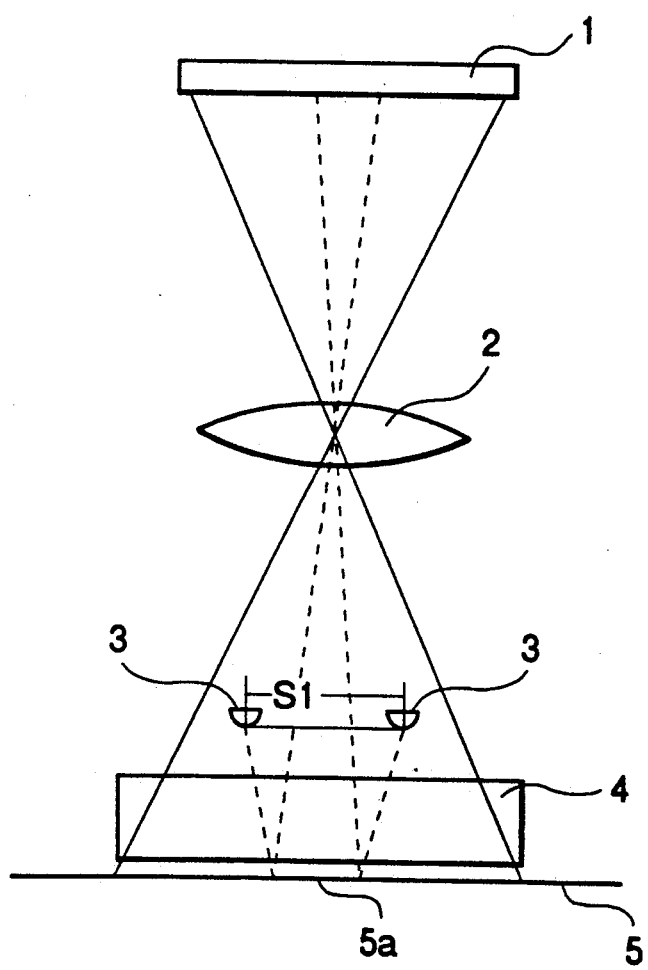
FIG. 1 is a front elevation diagrammatically illustrating the internal arrangement of components forming a preferred embodiment of a bar code reader system according to the present invention.

The preferred embodiments of the present invention will be discussed herebelow with reference to the accompanying drawings. It should be noted that like reference numerals to those of the prior art represent like components.

Figure 14:
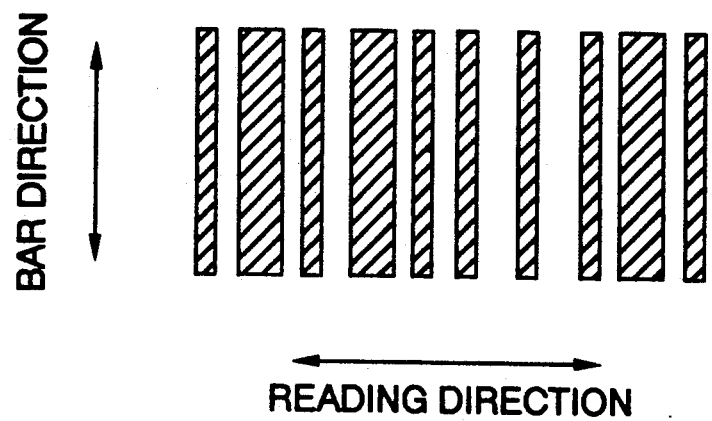
FIG. 14 is an illustration showing one example of a bar code.
Figure 15:
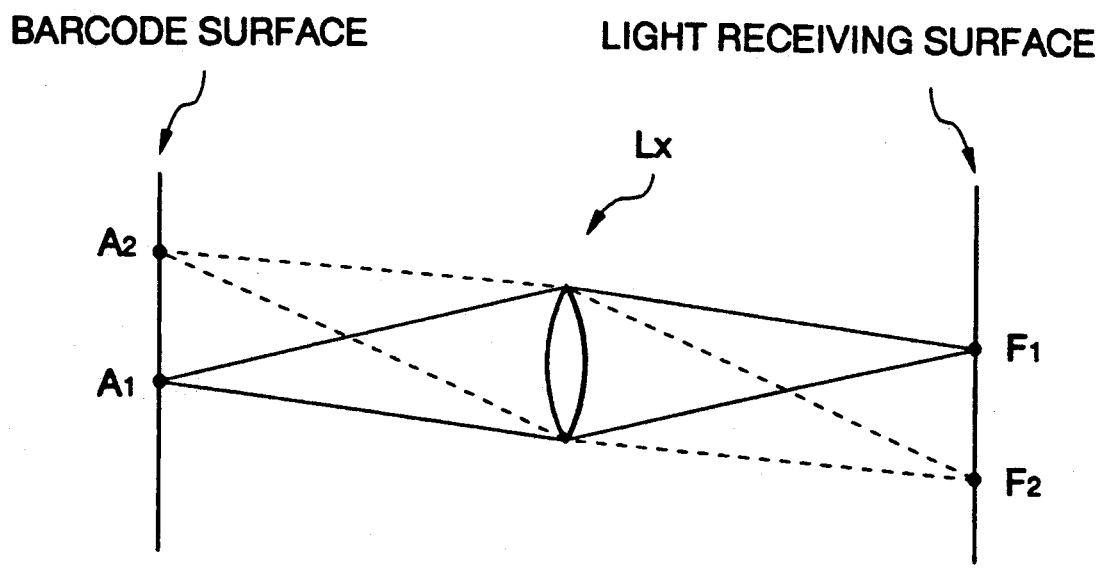
FIG. 15 is an illustration showing the primary light flux in the bar code reader system employing only a focusing lens.

At first, the principle of the present invention will be discussed briefly with reference to FIGS. 14 to 16. Considering reading information from a bar code as illustrated in FIG. 14, the bar code information is read by reading respective individual bar information in a direction perpendicular to the direction of the longer edges of the bars. The direction to read the bar code information will be hereafter referred to as "reading direction". Also, the direction along which the longer edges of the bars, i.e., solid bars and white bars, are oriented will be hereafter referred to as "bar direction". As viewed in a direction perpendicular to the surface carrying the bar code, when only focusing lens $L_x$ is provided as in the prior art, the images of points $A_1$ and $A_2$ on the surface are formed at points $F_1$ and $F_2$ on a light receiving surface of an image pick-up means, as shown in FIG. 15.

Figure 16A:
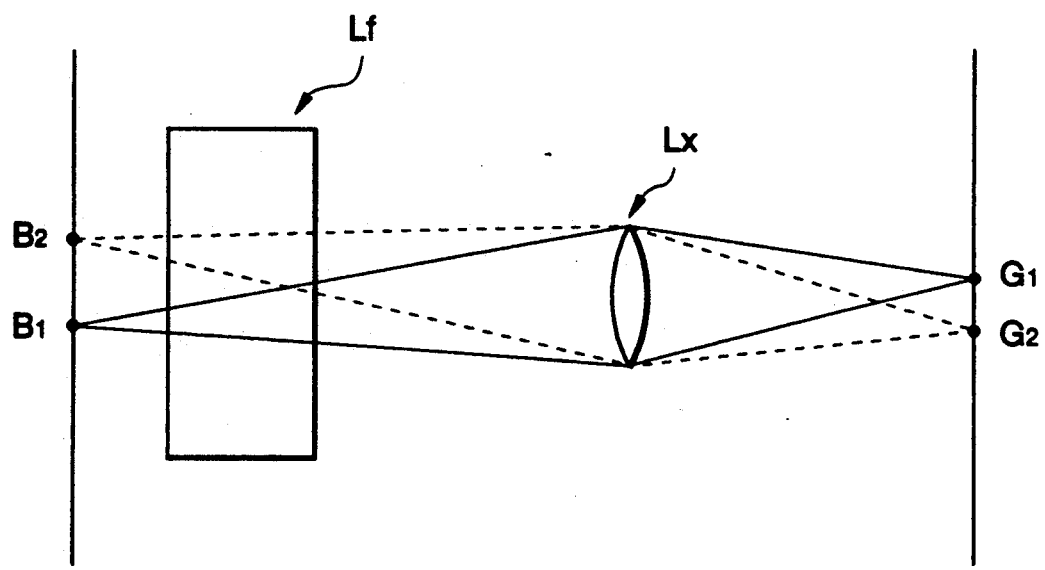
FIGS. 16(a) and 16(b) are illustrations showing the primary light flux of the bar code reader system according to the present invention, in which a cylindrical lens body is disposed between a focusing lens and the bar code.
Figure 16B:
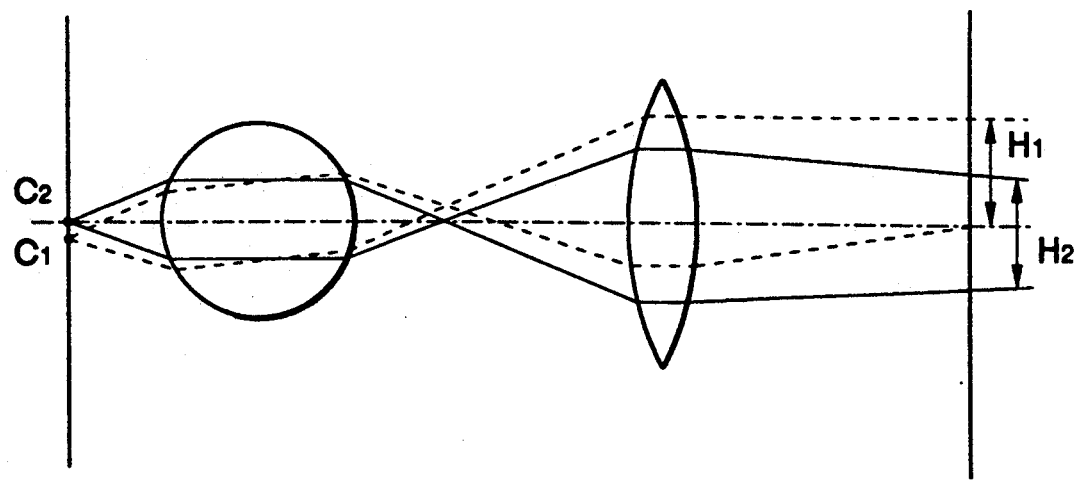

Conversely to this, according to the present invention, a cylindrical lens body $L_f$ is disposed between the surface carrying the bar code and the focusing lens $L_x$. The cylindrical lens body $L_f$ is arranged with the axis thereof being oriented in parallel relationship to the surface along the reading direction. Therefore, reflected light beam reflected from points $B_1$ and $B_2$ is deflected in the axial direction of the cylindrical lens body $L_f$ by a magnitude so that no substantial scattering of the reflected light beam is caused, as shown in FIG. 16(a). On the other hand, in the direction perpendicular to the axis of the cylindrical lens body $L_f$, the reflected light beams reflected from points $C_1$ and $C_2$ are refracted to disperse to establish dispersed light beams as illustrated by $H_1$ and $H_2$, as shown in FIG. 16(b). Considering a single solid bar, the image of the point on the solid bar is thus projected on the light receiving surface as a line. As set forth above, a void, blur, distortion and other defects in the solid bar potentially become a cause of reading errors. However, in the present invention the images of respective of individual points on the solid bar are projected on the light receiving surface of the image pick-up device in lines in overlapping manner. Therefore, a defect on the image due to presence of a void can be compensated by the solid image of the adjacent points. On the other hand, the distortion of the projected image due to presence of a blur or distortion on the bar code can be faded by the contrast with the surrounding region. Also, a spot in the white bar, which can also be the cause of a reading error, can be faded by the white image established with respect to adjacent blank points.

Therefore, since the micro-bar code reader system according to the present invention irradiates a light beam from a light source to the surface carrying the bar code and receives reflected light therefrom, through the cylindrical lens body, the image of the bar code is formed on the image pick-up means in a form dispersed in the bar direction. As a result, the defects of the bar code caused in printing can be compensated in the bar direction to facilitate formation of image data which can be decoded.

Also, since external light penetrating through a cutout formed in a housing can be scattered and cannot reach the image pick-up means, the influence of the external light which otherwise causes reading error or makes reading of information impossible can be successfully avoided.

Furthermore, since the cut-out portion of housing is closed by the cylindrical lens body, the external dust, dirt or so forth hardly will penetrate into the interior space of the bar code reader system, contamination of the internal components by such dust, dirt or so forth, which otherwise causes failure of components or the entire system, can be successfully avoided.

EMBODIMENT 1

Figure 2:
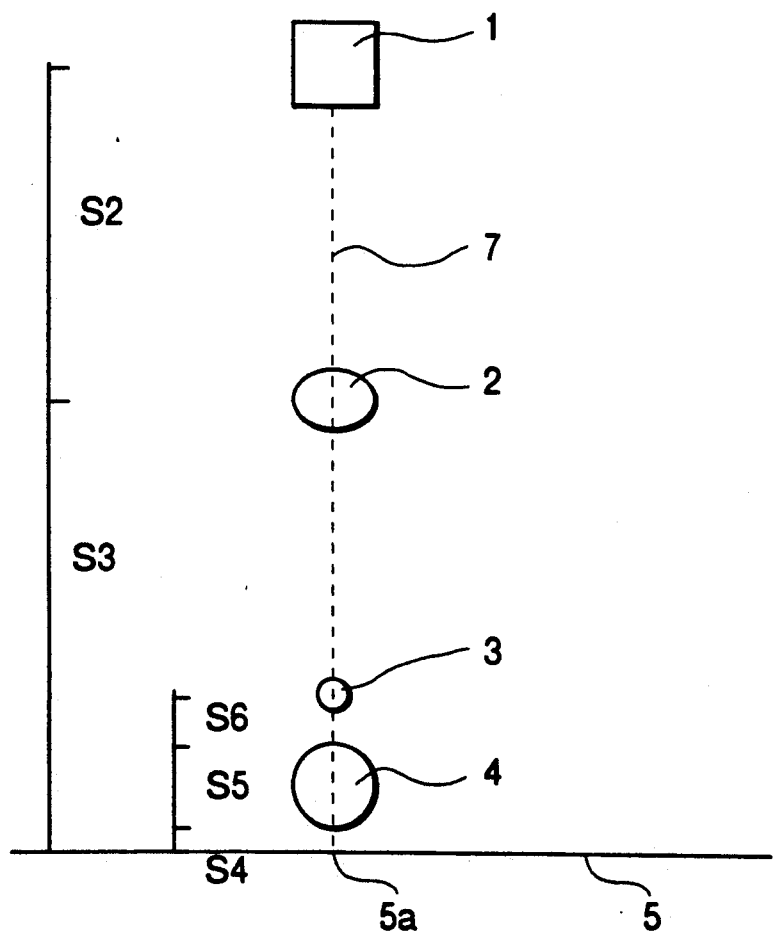
FIG. 2 is a side elevation of the bar code reader system of FIG. 1.

FIG. 1 diagrammatically illustrates internal components of a preferred embodiment of a bar code reader system according to the present invention. FIG. 2 illustrates a side elevation of the components of FIG. 1. The bar code reader system generally comprises an image pick-up means 1, such as a CCD sensor, a focusing lens 2, light emitting bodies 3, such as LEDs which are arranged in spaced apart relation in a lateral direction (a longitudinal direction of the CCD sensor array 1) at a given distance $S_1$ (e.g., 10 mm in the shown embodiment), and a cylindrical lens body 4 arranged transversely to a bar code 5a and having substantially circular cross-section. In the practical manner of picking-up the image of the bar code, image pick-up elements forming an array of the CCD sensor are scanned in the reading direction (which may correspond to the longitudinal direction of the CCD sensor) by a non-shown control circuit for obtaining image information in order. In a concrete embodiment, but not being limitative, the lens body 4 is provided with an external diameter of 5.0 mm and a refraction index of 1.488. The lens body 4 may be formed of either a synthetic resin or a glass. The lens body 4 is so positioned as to have a distance $S_4$ (e.g., 2 mm in the shown embodiment) from the irradiating surface on which the bar code 5a is provided and to have a distance $S_6$ (e.g., 3 mm in the shown embodiment) from the light emitting bodies 3. The surface, on which the bar code is provided by way of printing, sticking a bar code label or any other appropriate means, will be hereafter referred to as "bar code surface". In addition, the lens body 4 is arranged with an axial center, thereof oriented in a direction consistent with a bar code reading direction, in which the bar code reader system is scanned and therefor substantially perpendicular to a direction of the longer edge of the bars of the bar code. The direction of the longer edge of the bars of the bar code will be hereafter referred to as "bar direction". On the other hand, the focusing lens 2 is so arranged as to have a given distance $S_3$ (e.g., 27 mm in the shown embodiment) from the bar code 5a and to have a given distance $S_2$ (e.g., 21 mm in the shown embodiment) from the CCD sensor 1. These components are arranged on a common light beam axis 7.

Figure 3:
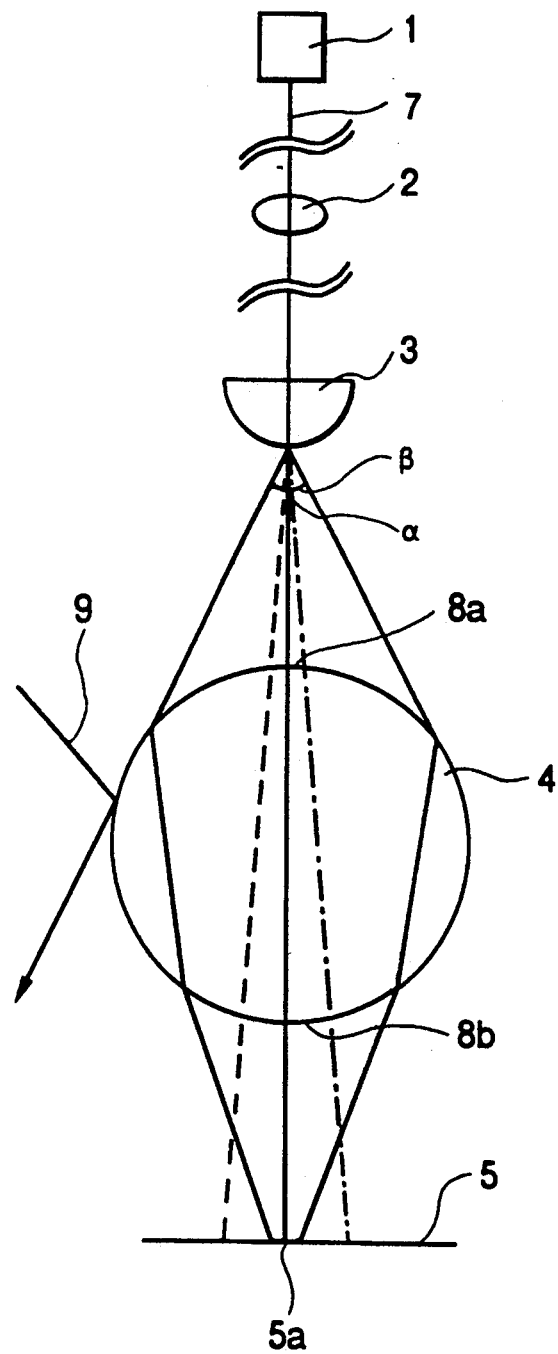
FIG. 3 is an illustration of a primary light flux in a first embodiment of the present invention.

In the bar code reader system constructed as set forth above, the light beams emitted from the LEDs 3 as the light emitting body pass the lens body 4 and reach the bar code 5a. The primary light flux of the emitted light beam is fragmentarily illustrated in FIG. 3. It should be noted that FIG. 3 illustrates the primary light flux in condition where the bar code reader system illustrated in FIG. 1 is employed and the bar code reader system is situated to place the lens body 4 to have a distance of approximately 2 mm between the bar code surface and the lower portion of the lens body. Most of the external light 9 is reflected by the incident surface of the lens body 4. Even when a beam of external light penetrates through the lens body 4, it will not be focused on the bar code surface 5. Therefore, the external light will never be irradiated on the bar code surface 5. The light beams emitted from the LEDs 3 are irradiated on the bar code surface 5 and reflected and received on a light receiving surface of the CCD sensor 1 through the lens body 4 and the focusing lens 2. Therefore, an image of the bar code 5a is picked up by the CCD sensor 1. The image thus formed in the CCD sensor 1 is output as an electrical analog signal. Such analog signal is then processed by an analog-to-digital (A/D) converter and decoder (not shown) to attain information contained in the bar code 5a. It should be noted that the light beams in the angular range $\beta$ about the light beam axis 7 irradiated onto the lens body 4 from the LEDs 3 are focused on the bar code surface 5, as shown in FIG. 3. This can be compared with the angular range $\alpha$ of the light beam from the LEDs 3 as in the prior art. As will be clear, by the effect of the lens body 4, a wider angular range of light beam can be focused on the bar code surface 5 in comparison with that in the prior art.

Figure 4:
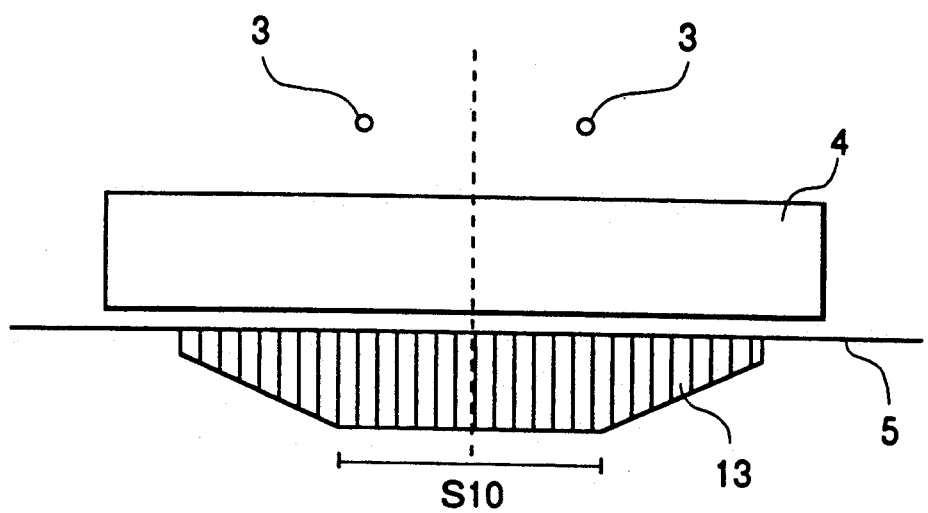
FIG. 4 is an illustration showing a distribution of an amount of light on an irradiated surface as viewed from a side in FIG. 3.
Figure 10:
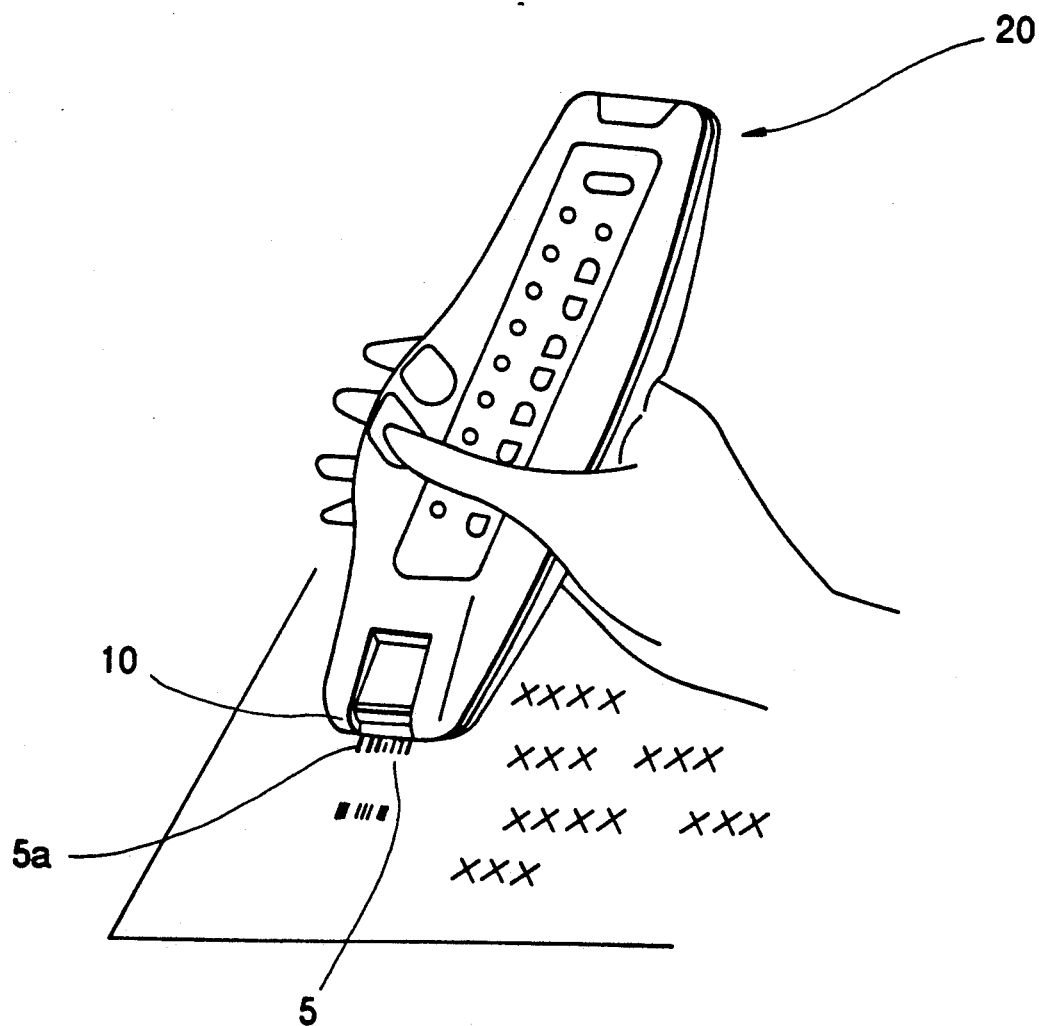
FIG. 10 is a perspective view of a conventional bar code reader system.
Figure 11:
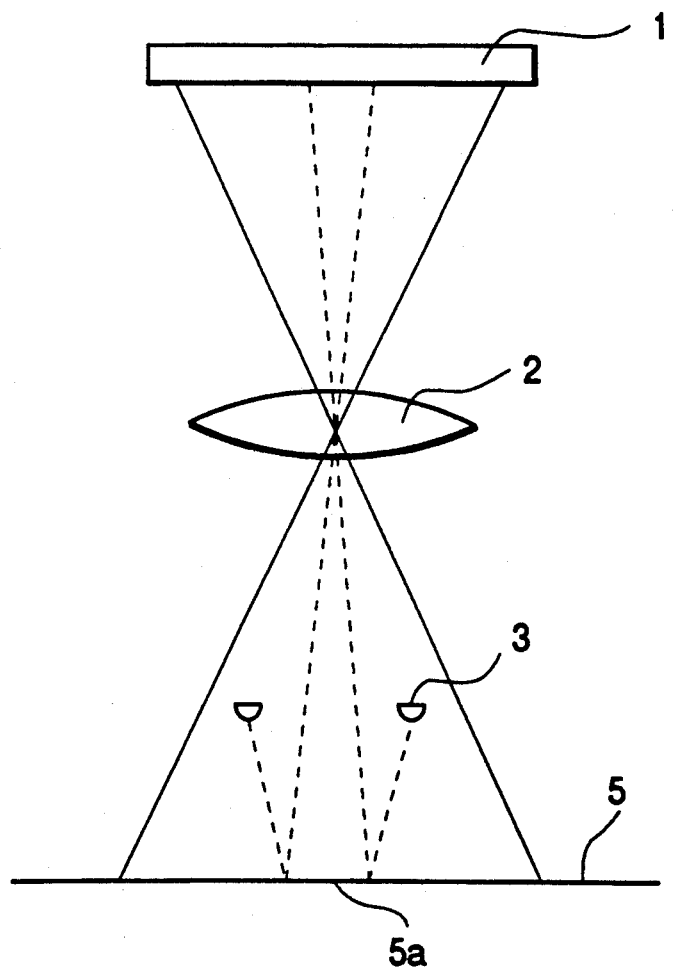
FIG. 11 is a front elevation diagrammatically showing the arrangement of internal components of the conventional bar code reader system.
Figure 12:
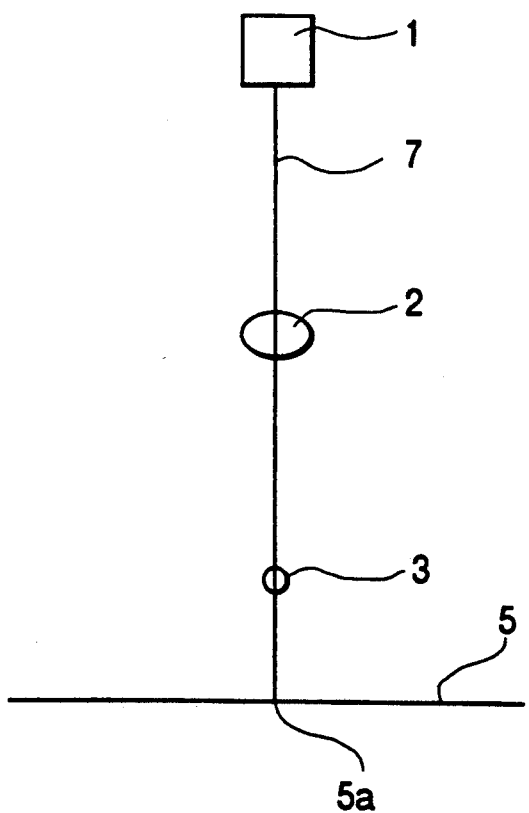
FIG. 12 is a side elevation of the arrangement of FIG. 11.
Figure 13A:
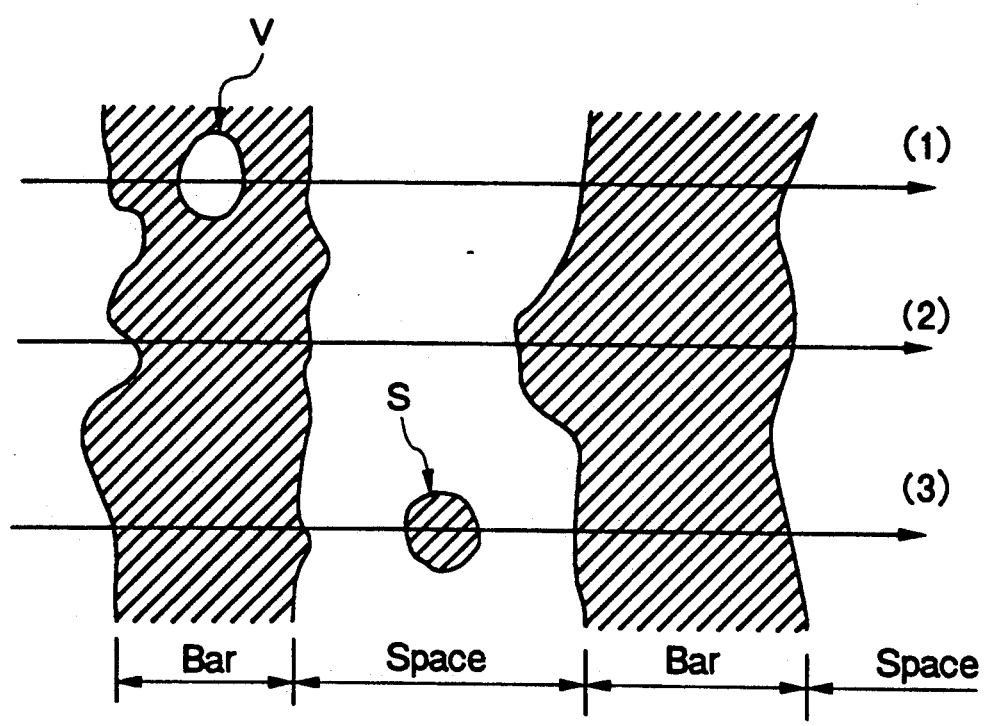
FIGS. 13(a) and 13(b) respectively are an enlarged illustration of a bar code and a timing chart showing a result of reading the bar code shown in FIG. 13(a)
Figure 13B:
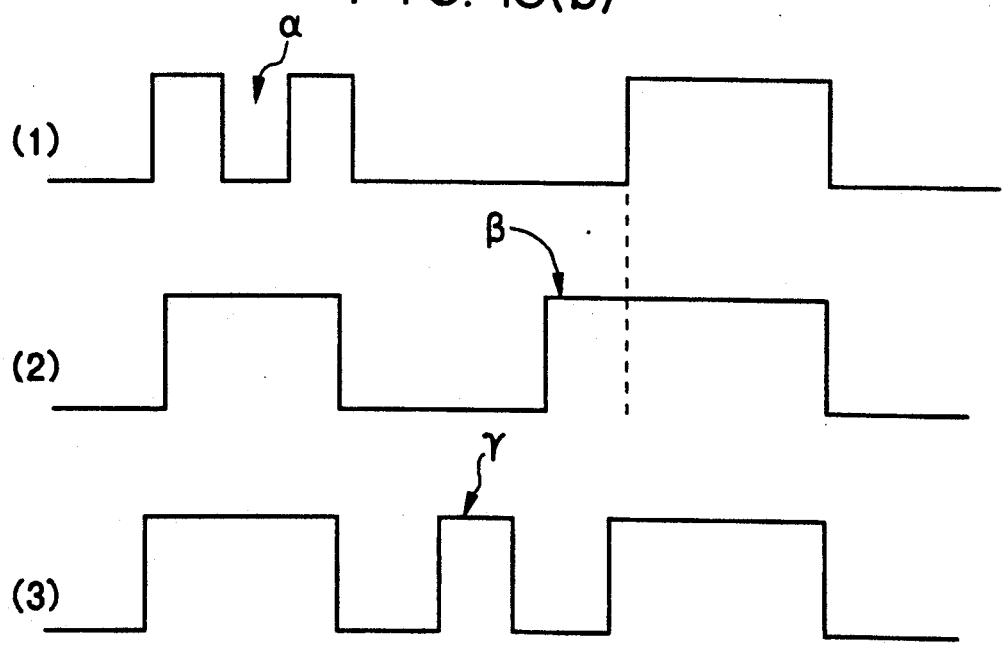

FIG. 4 is an illustration as viewed from the side in FIG. 3 and showing the distribution of the amount of light 13 on the bar code surface irradiated by the light beams from the LEDs 3 arranged at a distance of 10 mm from one another through the lens body 4. The distribution of the amount of light on the bar code surface 5, as illustrated in FIG. 4, is substantially equal to that in in the case where no lens body 4 is provided at a width $S_{10}$ (e.g., approximately 14 mm in the shown embodiment). Also, even when the bar code is read at a skewed attitude of the bar code reader system, the shown embodiment can reduce the influence of external light penetrating through the cut-out portion 10 of the bar code reader system (see FIG. 10 which shows the prior art). Furthermore, since the lens body 4 is oriented substantially transverse to the light beam axis and thus parallel to the open end of the housing of the bar code reader system, it may serve to block penetration of dust and dirt into the interior of the bar code reader system.

EMBODIMENT 2

Figure 5:
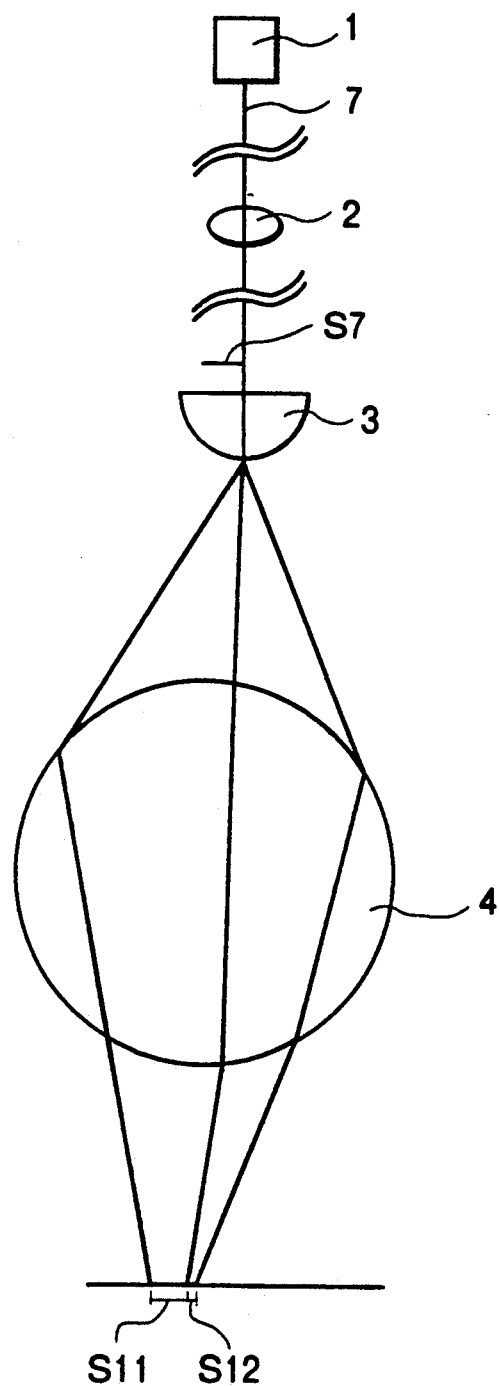
FIG. 5 is an illustration of the primary light flux in a second embodiment of the present invention.

The second embodiment is a modification of the foregoing first embodiment. In case of the bar code reader system having an optical system of the construction illustrated in the first embodiment, it is possible to form images with light reflected from intersections 8a and 8b between the surface of the lens body 4 and the light beam axis 7 to cause reading error or to make reading impossible. In the embodiment shown in FIG. 5, in order to reduce the influence of the light reflected from the intersections 8a and 8b, the lens body 4 is offset from the light beam axis 7 in a direction transverse to the longitudinal direction of the CCD sensor 1 (i.e., lateral direction in FIG. 5) for a given offset magnitude $S_7$ (e.g., 0.5 mm in the shown embodiment). The primary light flux in this case is shown in FIG. 5. In this embodiment, since the incident angle of the light beam at the intersections 8a and 8b is not a right angle relative to the surface on the lens body 4, light reflected from the intersections 8a and 8b will never return to the CCD sensor 1. Therefore, the problem of the former embodiment can be solved to provide improved performance in reading the bar code 5a.

EMBODIMENT 3

Figure 6:
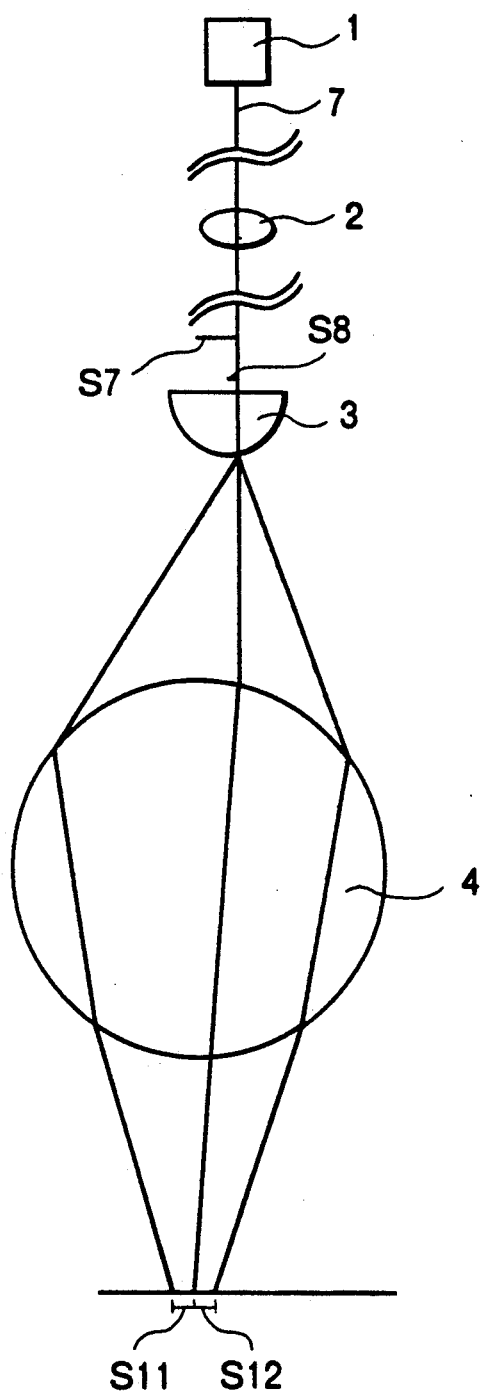
FIG. 6 is an illustration of the primary light flux in a third embodiment of the present invention.

As shown in FIG. 6, the lens body 4 is offset from the light beam axis 7 in a direction transverse to the longitudinal direction of the CCD sensor 1 (i.e., lateral direction in FIG. 6) in a given offset magnitude $S_7$ (e.g., 0.5 mm in the shown embodiment), as in the second embodiment. In addition, the LEDs 3 are also offset from the light beam axis 7 in a direction transverse to the longitudinal direction of the CCD sensor 1 by a given magnitude $S_8$ (e.g., 0.2 mm in this embodiment). The arrangement in the shown embodiment is intended to avoid displacement of the focusing center on the bar code surface 5 and the light beam axis 7 due to the influence of tolerance in assembling components.

Namely, such arrangement of the LEDs 3 is intended to compensate for a difference between distances $S_{11}$ and $S_{12}$ (shown in FIG. 5) from the light beam axis 7 to the Outer edges of the focused light beam due to offset of the lens body 4. The primary light flux to be established in the shown embodiment is illustrated in FIG. 6. As shown in FIG. 6, the distances $S_{11}$ and $S_{12}$ between the light beam axis 7 and the outer edges of the focused light beam become substantially equal to each other. Therefore, a fine image can be established on the CCD sensor 1.

Embodiment 4

Figure 7:
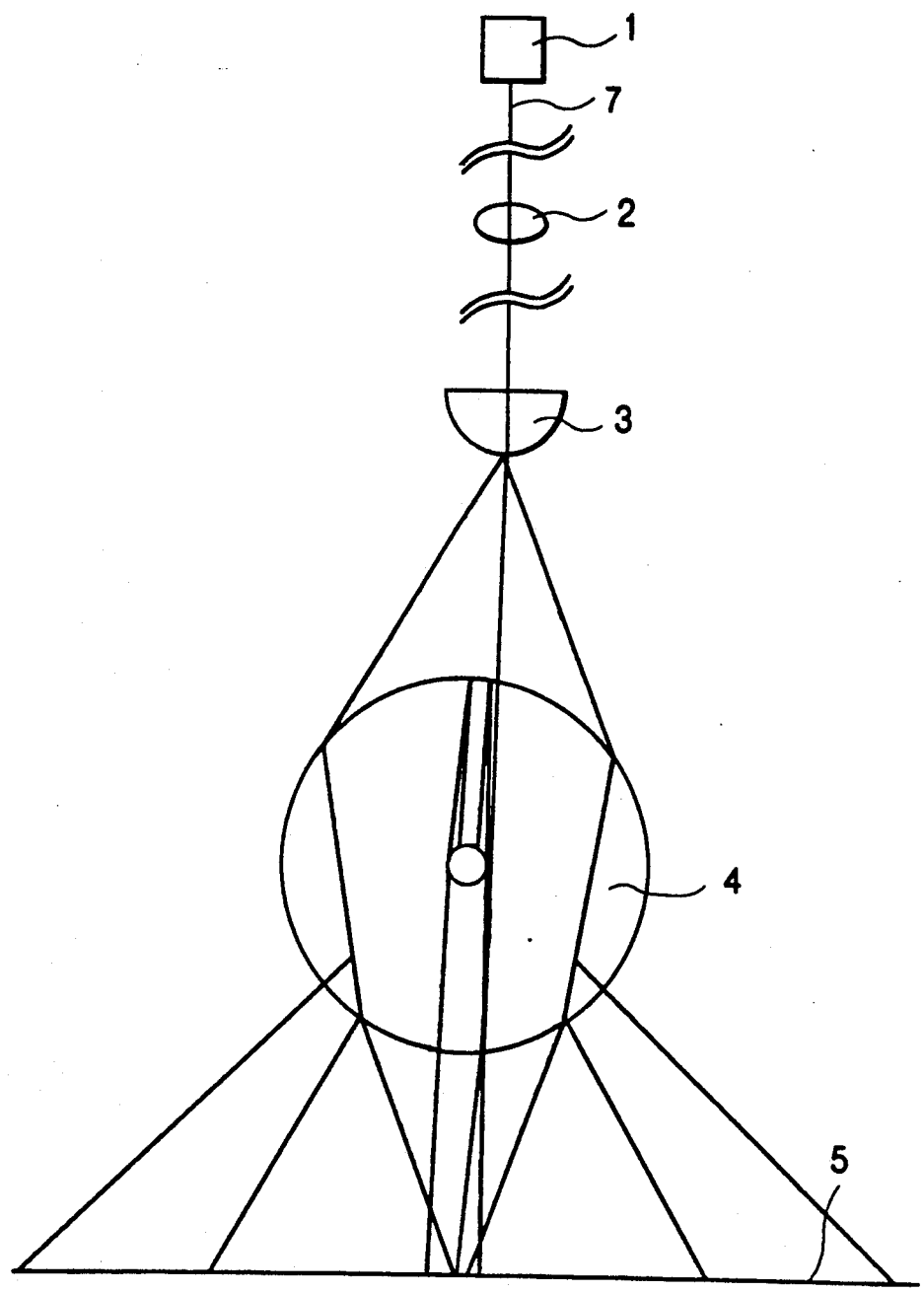
FIGS. 7 to 9 are illustrations of the primary light flux in a fourth embodiment of the present invention.
Figure 8:
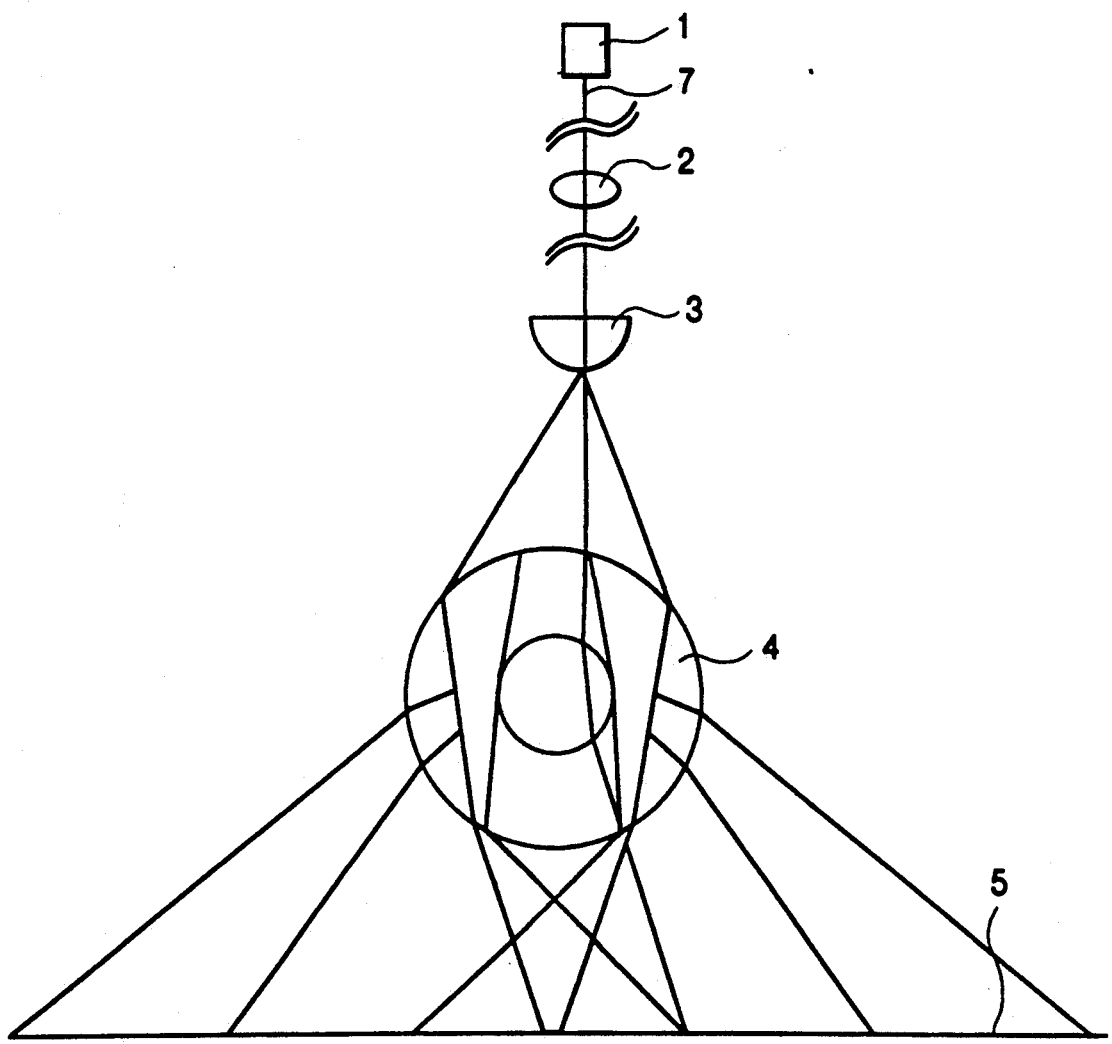
Figure 9:
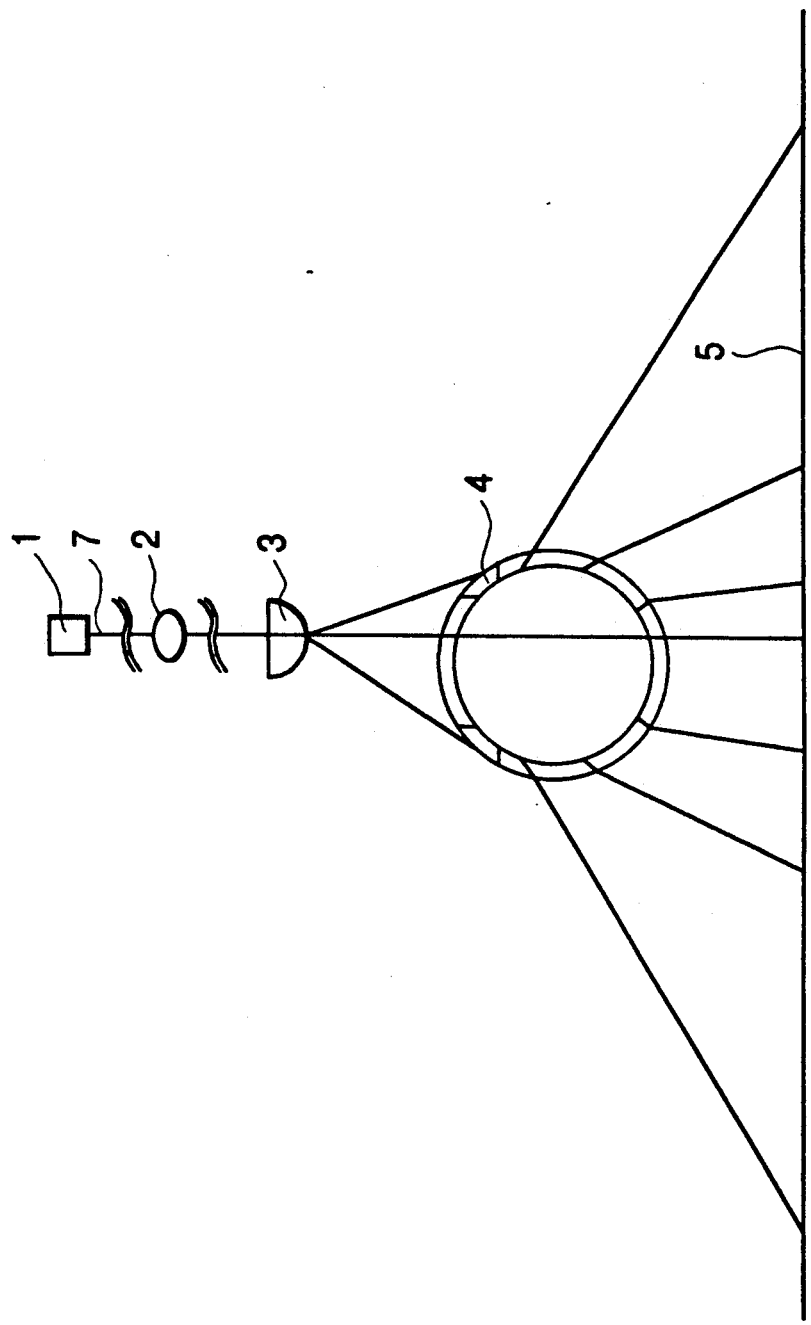

As shown in FIGS. 7 to 9, a fourth embodiment employs lens bodies 4 of hollow construction. The LEDs 3 and the lens body 4 are arranged at offset position as those proposed in the foregoing third embodiment. Namely, the lens body is offset in the transverse direction to the longitudinal direction of the CCD sensor 1 by an amount on the magnitude of 0.5 mm, and the LEDs 3 are offset in the transverse direction by an amount on the magnitude of 0.2 mm. The primary light fluxes in this embodiment are shown in FIGS. 7 to 9. It should be noted that FIG. 7 shows a case where a hollow cylindrical lens body having of 0.6 mm an external diameter of 5.0 mm and an internal diameter of 0.6 mm is employed, FIG. 8 shows a case where a hollow cylindrical lens body having an external diameter, of 5.0 mm and internal diameter of 2.0 mm is employed, and FIG. 9 shows a case where a hollow cylindrical lens body having an external diameter of 5.0 mm an internal diameter of 4.4 mm is employed. Under the influence of the refraction index of the lens body 4, the focusing performance is decreased by increasing of the internal diameter. Therefore, depending upon application of the bar code reader system, optimal configuration of the lens body can be selected. It should be noted that the offset magnitudes $S_7$ and $S_8$ of the LEDs and the lens body 4 are not limited to those discussed above. Also, it is possible to employ various light emitting elements in place of LEDs. Furthermore, as the material for forming the lens body, any appropriate material other than glass, or synthetic resin can be used. Also, the refraction index of the lens body is not limited to the above-mentioned value (i.e., 1.488). In addition, as the image pick-up means, any other solid state image pick-up elements, conventional imaging tube and other image pick-up means can be employed in place of the CCD sensor.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. A bar code reader system for reading information contained in a micro-bar code, said system comprising:
    a light emitting body for irradiating a light beam onto a bar code surface on which said micro-bar code to be read is provided;
    a focusing lens for focusing a reflected light from said bar code surface;
    an image pick-up means for receiving the focused reflected light and forming an image of said micro-bar code to be read; and
    a cylindrical lens body arranged to pass both of the light beam from said light emitting body and the reflected light beam reflected from said bar code surface therethrough, said cylindrical lens, body being arranged with the axis thereof oriented substantially consistent with a bar code reading direction.

2. A micro-bar code reader system as set forth in claim 1, wherein said light emitting body is a pair of light emitting diodes.

3. A micro-bar code reader system as set forth in claim 1, wherein said image pick-up means includes an image pick-up element comprising a charge coupled device.

4. A micro-bar code reader system as set forth in claim 1, wherein said focusing lens and said image pick-up means are arranged along a common light beam axis.

5. A micro-bar code reader system as set forth in claim 4, wherein said cylindrical lens body is arranged on said common light beam axis.

6. A micro-bar code reader system as set forth in claim 4, wherein said cylindrical lens body is offset from said common light beam axis in a direction transverse to the axial direction of said cylindrical lens body.

7. A micro-bar code reader system as set forth in claim 4, wherein said light emitting body is arranged on said common light beam axis.

8. A micro-bar code reader system as set forth in claim 4, wherein said light emitting body is offset from said common light beam axis in a direction transverse to the axial direction of said cylindrical lens body.

9. A micro-bar code reader system as set forth in claim wherein said cylindrical lens body is of a hollow cylindrical configuration.

10. A bar code reader system for reading information contained in a micro-bar code, said system comprising:
a light emitting body for irradiating a light beam onto a bar code surface on which said micro-bar code to be read is provided, said light emitting body comprising a pair of light emitting diodes;
a focusing lens for focusing a reflected light from said bar code surface;
an image pick-up means for receiving the focused reflected light and forming an image of said micro-bar code to be read, said image pick-up means comprising a charge coupled device serving as an image pick-up element; and
a cylindrical lens body arranged to pass both of the light beam from said light emitting body and the reflected light beam reflected from said bar code surface therethrough, said cylindrical lens body being arrange with the axis thereof oriented substantially consistent with a bar code reading direction.

11. A micro-bar code reader system as set forth in claim 10, wherein said focusing lens and said image pick-up means are arranged along a common light beam axis.

12. A micro-bar code reader system as set forth in claim 11, wherein said cylindrical lens body is arranged on said common light beam axis.

13. A micro-bar code reader system as set forth in claim 11, wherein said cylindrical lens body is offset from said common light beam axis in a direction transverse to the axial direction of said cylindrical lens body.

14. A micro-bar code reader system as set forth in claim 11, wherein said light emitting body is arranged on said common light beam axis.

15. A micro-bar code reader system as set forth in claim 11, wherein said light emitting body is offset from said common light beam axis in a direction transverse to the axial direction of said cylindrical lens body.

16. A micro-bar code reader system as set forth in claim 10, wherein said cylindrical lens body is of a hollow cylindrical configuration.

* * * * *